US010513953B2

(12) United States Patent
Pelletier et al.

(10) Patent No.: US 10,513,953 B2
(45) Date of Patent: Dec. 24, 2019

(54) DRIVE SYSTEM AND ASSOCIATED MOTOR VEHICLE

(71) Applicant: TOTAL MARKETING SERVICES, Puteaux (FR)

(72) Inventors: Anthony Pelletier, Lyons (FR); Philippe China, Seyssuel (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 15/774,603

(22) PCT Filed: Nov. 10, 2016

(86) PCT No.: PCT/EP2016/077251
§ 371 (c)(1),
(2) Date: May 9, 2018

(87) PCT Pub. No.: WO2017/081142
PCT Pub. Date: May 18, 2017

(65) Prior Publication Data
US 2018/0328241 A1    Nov. 15, 2018

(30) Foreign Application Priority Data
Nov. 13, 2015  (FR) ..................... 15 60874

(51) Int. Cl.
*F01M 11/02* (2006.01)
*F02B 39/14* (2006.01)
(Continued)

(52) U.S. Cl.
CPC .............. *F01M 11/02* (2013.01); *F01M 1/02* (2013.01); *F02B 39/14* (2013.01);
(Continued)

(58) Field of Classification Search
CPC . F01M 1/02; F01M 11/02; F01M 1/12; F01M 2001/0215; F01M 2011/021
See application file for complete search history.

(56) References Cited

U.S. PATENT DOCUMENTS 6,408,812 B1   6/2002  Chamberlin et al.
9,109,477 B2 *  8/2015  Caine ....................... F01M 1/02
(Continued)

FOREIGN PATENT DOCUMENTS

EP   0 503 635 A1   9/1992
FR   2 605 677 A1   4/1988
(Continued)

OTHER PUBLICATIONS

DSI—Delta Services Industriels SPRL: "TC-Lube technical description", May 31, 2012 (May 31, 2012), XP055287001, Retrieved from the Internet <URL:http://www.deltabeam.net/sites/default/files/pdfs/TC-Lube_technical-brochure_DSi_may2012.pdf> [retrieved on Jul. 8, 2016].
(Continued)

*Primary Examiner* — Long T Tran
(74) *Attorney, Agent, or Firm* — Young & Thompson

(57) ABSTRACT

This drive system for a motor vehicle includes a top end and a bottom end that are coupled together, a kinematic drive chain, a compressor, a main lubrication system, that includes a main circuit and a main pump, which supplies at least the bottom end with a main lubricant via the main circuit, and a secondary lubrication system, that includes at least one secondary circuit separated from the main circuit and at least one secondary pump separate from the main pump, the secondary pump supplying the top end and/or the compressor with a secondary lubricant via the secondary circuit. The secondary lubrication system includes at least one secondary actuator mechanically separate from the kinematic drive
(Continued)

chain and that drives the secondary pump to supply the top end and/or the compressor with the secondary lubricant.

19 Claims, 2 Drawing Sheets

(51) Int. Cl.
*F01M 1/02* (2006.01)
*F02B 37/00* (2006.01)

(52) U.S. Cl.
CPC ............... *F01M 2001/023* (2013.01); *F01M 2001/0215* (2013.01); *F01M 2001/0246* (2013.01); *F01M 2001/0269* (2013.01); *F01M 2011/021* (2013.01); *F02B 37/00* (2013.01)

(56) References Cited

U.S. PATENT DOCUMENTS

| | | | | |
|---|---|---|---|---|
| 2014/0326225 | A1* | 11/2014 | Shioda | F02C 6/12 123/559.1 |
| 2014/0371012 | A1* | 12/2014 | Moriyama | F16H 61/00 474/28 |
| 2015/0275713 | A1* | 10/2015 | Bidner | F01M 1/02 123/41.42 |
| 2016/0341081 | A1* | 11/2016 | Takama | F02B 39/14 |

FOREIGN PATENT DOCUMENTS

| | | |
|---|---|---|
| FR | 2 843 998 A1 | 3/2004 |
| JP | S62 193140 U | 12/1987 |
| JP | 2001 241313 A | 9/2001 |
| WO | 2015/137273 A1 | 9/2015 |

OTHER PUBLICATIONS

Ram Govindasamy: "Turbocharger bearing lubrication system—DieselShip", Apr. 7, 2016 (Apr. 7, 2016), XP055287020, Retrieved from the Internet <URL:https://dieselship.com/marine-technical-articles/motor-engineering-knowledge/turbocharger-bearing-lubrication-system/> [retrieved on Jul. 8, 2016].
TC-Lube, Lubrication Unit for Turbochargers, Technical Brochure, TC-Lube technical description—DSi sprl—May 2012, Belgium.
International Search Report, dated Feb. 6, 2017, from corresponding PCT/EP2016/077251 application.
FR Search Report, dated Jul. 20, 2016, from corresponding FR 1 56 0874 application.

* cited by examiner

DRIVE SYSTEM AND ASSOCIATED MOTOR VEHICLE

FIELD OF THE INVENTION

Background of the Invention

The present invention relates to a drive system for a motor vehicle as well as a motor vehicle comprising such a drive system.

The majority of current motor vehicles are equipped with a drive system including an internal combustion engine with two parts:
- A so-called "lower engine" part, comprising a moving coupling system (connecting rods, pistons and crankshaft) within an "engine block", containing the cylinders, and a case containing the engine lubricant.
- A so-called "upper engine" part made up of the cylinder head(s), which are assembled on the lower engine part. The cylinder head is the seat of the distribution of the intake gases in the combustion chamber, through an intake pipe and intake valves, and the discharge of the combustion gases, through an exhaust pipe and exhaust valves.

The limitation between the "lower engine part" and the "upper engine part(s)" is embodied by the cylinder head gasket(s).

The combustion chamber, seat of the combustion of an air-fuel mixture, is the space comprised between the top of the piston when it is in the high position, called "upper dead center", and the cylinder head.

FR-A-2,605,677 describes a lubrication system for an internal combustion engine that comprises a primary greasing circuit for the lower engine part incorporating an oil pump mounted at the end of the crankshaft, as well as a secondary greasing circuit for the upper engine part that is independent of the primary circuit and in turn incorporates a pump mounted at the end of the camshaft of the engine. The lubrication system is thus separated into two separate circuits, such that the oil to lubricate the upper engine part is not polluted by the oil used to lubricate the lower engine part, which improves the lifetime of the engine.

Nevertheless, the lubrication of the upper engine part is only done when the engine is running, such that the start-up and stop phases of the engine cause significant wear of the components of the upper engine part.

The drive system of certain motor vehicles further comprises a compressor designed to compress the air intended to form the air-fuel mixture before its intake into the combustion chambers in order to improve the power of the engine. Such a compressor is traditionally actuator either by the crankshaft of the engine, or using the kinetic energy contained in the exhaust gases emitted by the engine. In the second case, the compressor is equipped with a drive turbine, which is placed on the path of the exhaust gases, so as to form a turbocompressor.

In the case of engines equipped with a turbocompressor, the lubrication of the latter is also stopped when the engine is stopped, inasmuch as the operation of the lubricant pump depends on that of the crankshaft. When stopped, the lubricant residues still present in the lubrication system of the turbocompressor are in contact with hot metal surfaces in the body of the latter. Indeed, the proximity of the hot exhaust gases on the turbine side creates a temperature increase of the metal parts of the body of the turbocompressor by conduction. This phenomenon is sometimes called "coking" of the lubricant.

Furthermore, economic, legislative and environmental constraints are pushing designers and users of internal combustion engines to decrease the fuel consumption of these engines. For example, the European standards set out a $CO_2$ emission level below or equal to 95 g/km beginning in 2021.

SUMMARY OF THE INVENTION

The invention aims to resolve these issues by proposing a new drive system with an improved lifetime and reduced fuel consumption. To that end, the invention relates to a drive system for a motor vehicle, the system comprising:
- an internal combustion engine, which comprises an upper engine part and a lower engine part that are coupled, as well as a kinematic drive chain including at least one piston and a crankshaft,
- a compressor, which equips the internal combustion engine, and which is designed to compress, at least in part, an intake fluid intended to fill cylinders of the lower engine part,
- a main lubrication system, which comprises a main circuit and a main pump, which supplies at least the lower engine part with a main lubricant via the main circuit, and
- a secondary lubrication system, which comprises at least one secondary circuit separated from the main circuit and at least one secondary pump separate from the main pump, the secondary pump supplying the upper engine part and/or the compressor with a secondary lubricant via the secondary circuit.

According to the invention, the secondary lubrication system comprises at least one secondary actuator mechanically independent from the kinematic drive chain and that drives the secondary pump to supply the upper engine part and/or the compressor with the secondary lubricant.

Owing to the invention, the lubrication of the compressor and/or the upper engine part is done independently of the operation of the engine, and in particular its kinematic drive chain. The secondary lubrication system may for example be actuated before starting the engine so as to pre-lubricate the compressor and/or the upper engine part and thus to prevent the wear of the latter when starting the engine. Additionally, the lubrication of these elements can be extended after stopping the engine, in particular for cooling purposes.

The use of a lubricant suitable for the compressor, i.e., withstanding the temperature and with good friction characteristics, makes it possible to limit the pumping losses of the engine by facilitating the intake of the intake fluid while limiting the back pressure at the exhaust. This is reflected by an increase in the power, with an identical fuel consumption, or by decreased consumption with identical power. The reactivity of the compressor in the transitional phases, such as the accelerations, is also improved with the use of this adapted lubricant, which makes it possible to optimize the fuel consumption during these transitional phases.

Furthermore, the circulation of this lubricant after the engine is stopped makes it possible to discharge the calories therefrom and limit the stagnation of the lubricant on the hot parts, thereby correcting the coking issues.

The configuration of the lubrication system of the invention then makes it possible to optimize the lubricant supply based on the contact to be lubricated of the drive system. For each of the circuits, the pressure may be adapted to the maximum value of the required minimums for the lubrication of each of the contacts lubricated via the considered circuit. This results in a driving force of the pumps lower than in the case of a drive system in which a single global lubrication circuit is provided, such that a global energy gain is achieved.

Lastly, the secondary lubricant may be chosen to be particularly suitable for the lubrication of the compressor and/or the upper engine part, and in particular the physical, mechanical and thermal constraints of these parts of the drive system, while the main lubricant is particularly suitable for lubricating the lower engine part and for its own physical, mechanical and thermal constraints. The choice of a lubricant specifically adapted to the lower engine part makes it possible, at equal power, to obtain a reduced fuel consumption.

According to other advantageous features of the invention, considered alone or in combination:
- the secondary actuator operates with electrical energy.
- two separate secondary circuits are provided, including a first secondary circuit and a second secondary circuit that are separated, and wherein two secondary pumps are provided, including:
  - a first secondary pump, which supplies the upper engine part with a first secondary lubricant via the first secondary circuit, and
  - a second secondary pump, which is separate from the first secondary pump and which supplies the compressor with a second secondary lubricant via the second secondary circuit.
- the first secondary pump has a piston displacement lower than that of the second secondary pump.
- the composition of the first secondary lubricant is different from that of the second secondary lubricant.
- the main pump has a piston displacement greater than the piston displacement of each secondary pump, and which is preferably comprised between about 5 cc/revolution and 20 cc/revolution, preferably between about 7 cc/revolution and 12 cc/revolution, still more preferably about 10.7 cc/revolution.
- the main pump is actuated by the kinematic drive chain.
- the secondary pump is a variable flow rate pump.
- the main lubricant is a lubricating composition having a grade, according to the SAEJ300 classification, defined by the formula (X)W-(Y), in which X represents 0 or 5 and Y represents 4, 8, 12, 16 or 20, etc.
- the composition of the main lubricant is different from that of the secondary lubricant.
- the compressor is a turbocompressor.

The invention also relates to a motor vehicle comprising a drive system as defined above.

BRIEF DESCRIPTION OF DRAWINGS

The invention will be better understood upon reading the following description, provided solely as a non-limiting and non-exhaustive example and done in reference to the drawings, in which.

DETAILED DESCRIPTION OF THE INVENTION

Figure 1:
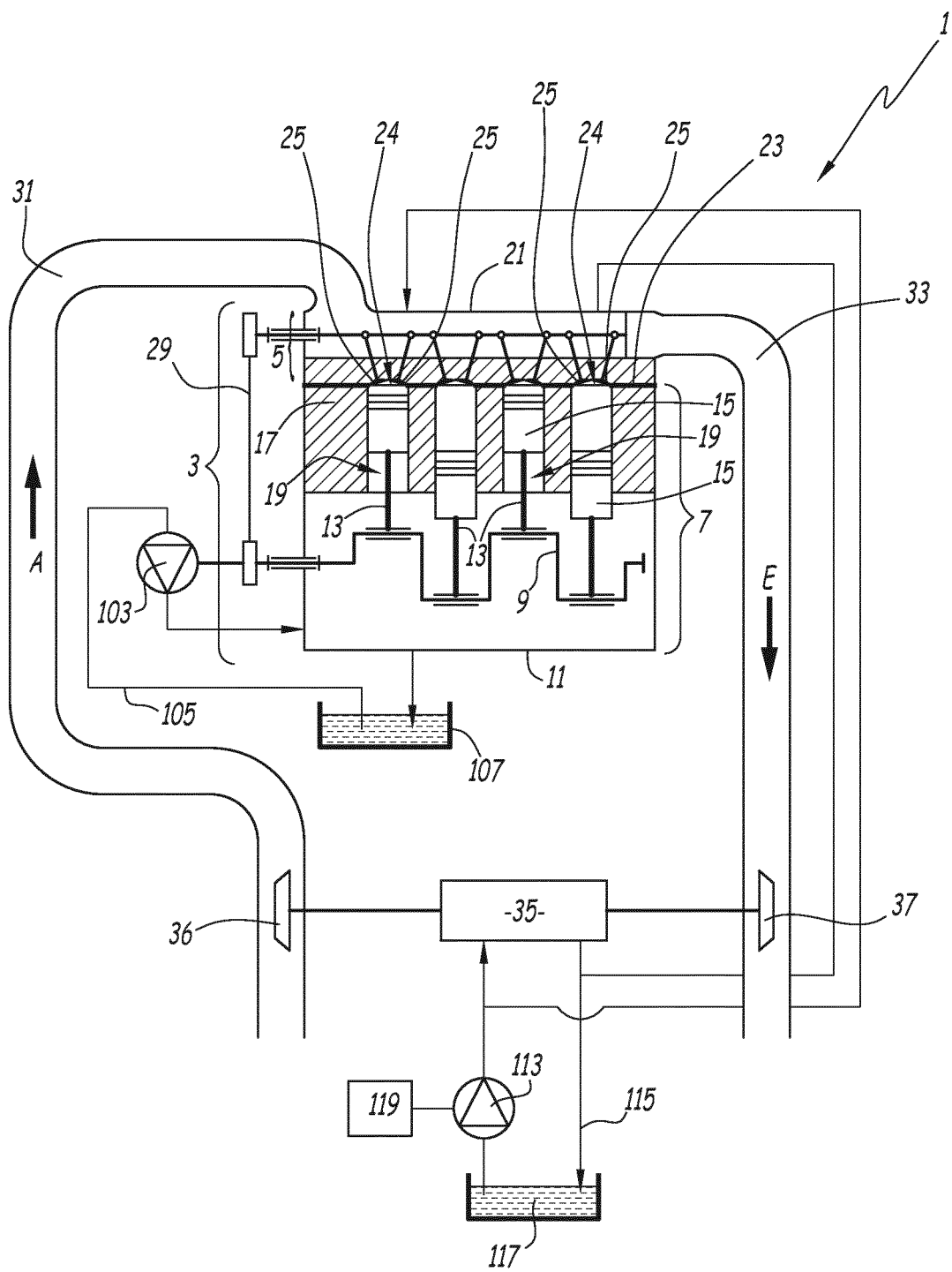
FIG. 1 is a schematic view of a drive system according to a first embodiment according to the invention.

The drive system 1 of FIG. 1 is designed to equip a motor vehicle, for example a land vehicle, such as a car.

Hereinafter, the expressions "high", "upper" and their equivalents are used to designate a direction oriented vertically toward the top of the vehicle when it is in a usage position, in which it is for example resting on the ground. The expressions "low", "lower" and their equivalents refer to an opposite direction.

The drive system 1 of FIG. 1 comprises an internal combustion engine 3, equipped with a compressor 35. The internal combustion engine 3 forms a mechanical assembly intended to rotate a crankshaft and an air supply system comprising the compressor 35, which for example forms a turbocompressor.

In a manner known as such, the internal combustion engine 3 comprises an upper engine part 5 and a lower engine part 7 that are coupled.

The lower engine part 7 includes a crankshaft 9 that rotates relative to the case 11 of the lower engine part 7, includes an engine block 17 or "cylinder block", within which the crankshaft 9 is mounted.

The lower engine part 7 also includes connecting rods 13 and pistons 15, each connecting rod 13 being mounted rotating on one of the pistons 15 and on the crankshaft 9. The engine block 17, belonging to the lower engine part 7, defines cylinders 19 within which the pistons 15 slide. The engine block 17 is downwardly closed off by the case 11, and upwardly by the upper engine part 7. The case 11 forms a pocket closed by the bottom, and is assembled by the top with the engine block 17. The pistons 15 are driven in an alternating translational movement within cylinders 19 in order to drive the crankshaft 9 via connecting rods 13. In the example of FIG. 1, four pistons 15 and four connecting rods 13 are shown. However, alternatively, the lower engine part 7 includes a single piston 15, a single connecting rod 13 and a single associated cylinder 19, or a larger number of pistons 15, connecting rods 13 and associated cylinders 19.

The upper engine part 5 comprises a cylinder head 21, equipped with a distribution system including members for distributing air and fuel toward the cylinders 19. The cylinder head 21 caps the engine block 17 via a cylinder head gasket 23 of the engine 3. The cylinder head gasket 23 constitutes the boundary between the upper engine part 5 and the lower engine part 7.

The space comprised between the top of each piston 15 in its cylinder 19, at the upper dead center, and the cylinder head 21, represents a combustion chamber 24. Each combustion chamber 24 comprises one, and preferably several, intake orifice(s), through which the air and fuel intake occurs. Depending on the type of combustion engine 3, the air and the fuel are taken in separately or already mixed in the combustion chambers, and are therefore generally referred to hereinafter as "intake fluid". Each combustion chamber 24 also comprises at least one exhaust orifice for the product of the combustion of this intake fluid. Each combustion chamber 24 is the seat of combustion reactions of the intake fluid, this reaction being done above the concerned piston 15, in order to generate the alternating translational movement of the piston 15 to drive the crankshaft 9.

The distribution system of the upper engine part 5 in particular includes valves 25 that each move between an open or closed position of one of the intake or exhaust orifices of the combustion chambers 24. The distribution system also includes a shaft 27, of the camshaft type, for controlling the valves 25. The control shaft 27 is parallel to the crankshaft 9 and is driven by the latter via a distribution belt 29 of the engine 3. Alternatively, in place of the distribution belt, the drive system 1 comprises a distribution chain or a gear assembly. Alternatively, the upper engine part 5 is provided with several control shafts, preferably driven by the crankshaft 9. Alternatively, the valves 25 can be controlled by actuators, for example electromagnetic, or electro-pneumatic, or electrohydraulic.

The crankshaft 9, the connecting rods 13, the pistons 15, the valves 25, the control shaft 27 and the distribution belt 29, or its mechanical alternatives defined above, belong to a kinematic drive chain of the engine 3. The kinematic drive chain of the engine 3 can comprise additional movable elements belonging to the engine 3, for example a second control shaft, a smaller or larger number of valves, a smaller or larger number of pistons of the two connecting rods. Ultimately, the kinematic drive chain of the engine 3 includes all of the moving components of the engine that are mechanically driven, directly or via transmission means, under the action of the combustion reaction of the intake fluid. Any moving component of the engine 3 not mentioned in the present description, and that is moved by means separate from this combustion reaction of the intake fluid, such as pneumatic, hydraulic or electric means, does not belong to the kinematic drive chain of the drive system 1.

An intake collector 31 of the drive system 1 is connected to the cylinder head 21 so as to distribute the intake fluid in the combustion chambers 24 of the lower engine part 7 via valves 25, called "intake valves". In general, the intake fluid is taken into the lower engine part 7 by passing through the upper engine part 5. An exhaust collector 33 of the drive system 1 is also connected to the upper engine part 5 to collect, from the combustion chambers 24, the products of the combustion reaction of the intake fluid, via valves 25 called "exhaust valves". These products for example form exhaust gases. The path of the intake fluid within the intake collector 31 is symbolized by the arrow A, and the path of the products of the combustion within the exhaust collector 33 is symbolized by the arrow E.

The drive system 1 comprises a compressor 35, which is designed to compress the intake fluid before it is taken into the combustion chamber 24, for example upstream from the intake collector 31. Preferably, the compressor 35 compresses the air intended to enter the composition of the intake fluid, the fuel itself being added to this air after the latter has been compressed by the compressor 35 before or during its intake into the combustion chambers 24. The compressor 35 is thus designed to compress, at least in part, the intake fluid intended to supply the upper engine part 5.

Several configurations for the intake of the intake fluid are therefore possible. For example, in the case of a drive system 1 working with a fuel of the gasoline type, this fuel may be injected upstream in intake ducts, or directly in the combustion chambers 24. In the second case, reference is made to a drive system with "Direct Gasoline Injection". In the case of a diesel drive system 1, the fuel is either injected directly into the combustion chambers 24, or taken into a pre-chamber of the drive system 1, upstream from the combustion chamber 24 and connected to the latter, where the combustion is initiated.

The compressor 35 comprises a compression member 36, of the centrifugal pump type, to compress the intake fluid, and in particular to compress all or part of the air entering the composition of this intake fluid. The compressor 35 preferably forms a turbocompressor. In this case, the compressor 35 comprises a turbine 37 driving the compression member 36. The turbine 37 is arranged downstream from the exhaust collector 33, or at least on the path of the products of the combustion E, so as to capture a portion of the enthalpy and/or the kinetic energy of these products E to drive the member 36 and thus to compress the intake fluid.

Alternatively, the compressor 35 can be driven by the kinematic drive chain of the engine 3, and for example by the crankshaft 9.

The drive system 1 further comprises a main lubrication system to lubricate the lower engine part 7. In the case at hand, this main lubrication system comprises a main circuit 105 and a main pump 103, which are shown schematically in FIG. 1. The main pump 103 for example has a piston displacement comprised between about 5 cc/revolution (cubic centimeters per revolution) and 20 cc/revolution, preferably between about 7 cc/revolution and 12 cc/revolution, still more preferably about 10.7 cc/revolution. The main pump 103 circulates a main lubricant, of the oil type, within the main circuit 105, to supply the lower engine part 7 with this main lubricant and to lubricate different members of the lower engine part 7, in particular belonging to the kinematic drive chain. The main circuit 105 extends partially within the lower engine part 7 in particular to lubricate the rotating connections between the crankshaft 9 and the connecting rods 13. The main circuit 105 includes a main lubricant reserve 107 and optionally an oil filter, not shown. The main circuit 105 is designed to lubricate, with the main lubricant, in particular a segment-piston-jacket zone of the lower engine part 7, which designates the parts in sliding contact of each piston 15 against its respective cylinder 19. To that end, the main circuit 105 for example comprises means for emitting a mist of main lubricant, not shown, at the segment-piston-jacket zone, said mist of main lubricant being emitted via bearings of the connecting rods 13. The supply of main lubricant is preferably done by bearings of the crankshaft 9, which are directly connected to a supply bar belonging to the main circuit 105. Optionally, the main circuit 105 comprises main lubricant wash bottles, not illustrated, which spit oil below the pistons 15 to cool them.

Preferably, the main pump 103 is actuated by the kinematic drive chain of the engine 3, and in particular by the crankshaft 9. Thus, when the engine 3 is running, the crankshaft 9 rotates and drives the main pump 103 systematically. The main pump 103 preferably has a variable flow rate and controlled pressure, such that its energy consumption is particularly low for pumping the main lubricant.

The drive system 1 also comprises a secondary lubrication system, which comprises a secondary circuit 115 that is separated and separate from the main circuit 105. The secondary circuit 115 supplies both the compressor 35 and the upper engine part 5 with a secondary lubricant, which is different from the main lubricant by its nature and/or its composition and/or its characteristics.

Preferably, the main lubricant is a lubricating composition having a grade, according to the SAEJ300 classification, defined by the formula (X)W-(Y), in which X represents 0 or 5 and Y represents 4, 8, 12, 16 or 20, etc. The main lubricant is for example the Quartz 9000 Future 0W-20 or Quartz V-drive 0W-20 lubricant, marketed by the company TOTAL SA. Other lubricants can be used for the main lubricant in place of those defined above.

For example, the secondary lubricant is the Quartz Ineo MC3 5W-30 or Quartz 9000 5W-40 lubricant marketed by the company TOTAL SA. Other lubricants can be used for the secondary lubricant in place of those defined above, as long as the main lubricant has a different composition from the secondary lubricant, these compositions respectively being adapted to the lubrication material constraints of the lower engine part 7, and the assembly including the upper engine part 5 and the compressor 35.

Alternatively, the main lubricant and the secondary lubricant have an identical composition.

The secondary lubrication system also comprises a secondary pump 113, of the hydraulic pump type, for circulating the secondary lubricant in the secondary circuit 115. In the example of FIG. 1, the secondary circuit supplies both the upper engine part 5 and the compressor 35 with the secondary lubricant.

The secondary circuit 115 preferably includes a secondary lubricant reserve 117 that is separate from the main lubricant reserve 107. The secondary circuit 115 extends partially within the upper engine part 5 in particular to lubricate the rotating connections between the control shaft 27 and the cylinder head 23 and the valves 25. The secondary circuit 115 extends partially within the compressor 35 in particular to lubricate the rotating connections of the member 36 and, if applicable, the turbine 37.

In this document, "separate circuits" means that a first lubricant circulating within a first circuit separate from a second circuit does not come into contact with a second lubricant circulating in the second circuit, the two circuits being separated by tight separating means such as gaskets or walls.

The secondary lubrication system comprises an electric motor 119, or at least an actuator supplied with electricity, driving the secondary pump 113, to supply the upper engine part 5 and the compressor 35 with the secondary lubricant. The pump 113 is thus an electrically driven pump. The electrical supply energy of the electric motor 119 is for example supplied by an electrical battery of the drive system 1. The electric motor 119 thus makes up a secondary actuator of the secondary pump 113, which is mechanically independent of the kinematic drive chain. Indeed, the electric motor 119 can be operated independently from the movement of the crankshaft 9, connecting rods 13, pistons 15, valves 25, control shaft 27 or distribution belt 29.

Under these conditions, the secondary pump 113 is controlled via the electric motor 119 to lubricate, with the secondary lubricant, the upper engine part 5 and the compressor 35 when the engine 3 is stopped. If necessary, it is possible to control, and vary, the flow rate of the secondary pump 113 by controlling the speed of the actuator 119. Preferably, irrespective of the supply energy of the actuator 119, it is provided that the secondary pump 113 has a variable flow rate by choosing an actuator 119 whose speed can be controlled. The secondary pump 113 is preferably actuated with the secondary actuator 119 to lubricate the upper engine part 5 and the compressor 35 with the secondary lubricant just before starting the engine 3, which corresponds to the setting of its kinematic drive chain in motion. Preferably, the secondary pump 113 is controlled with the secondary actuator 119 to lubricate the upper engine part 5 and the compressor 35 with the secondary lubricant for a predetermined length of time beginning after the engine 3 is stopped, which corresponds to an immobilization of its kinematic drive chain. In any case, the secondary pump 113 is actuated with the secondary actuator 119 to lubricate the upper engine part 5 and the compressor 35 with the secondary lubricant during the operation of the engine 3, i.e., when the kinematic drive chain is in motion. The wear of the upper engine part 5 and the compressor 35 is thus particularly reduced, in particular when it involves a turbocompressor, as well as the coking.

In the case of a vehicle including a hydraulic energy source, such as a hydraulic circuit with a pump, or a pneumatic energy source, such as an air circuit with a compressor, it is possible to provide a secondary actuator working from the pneumatic or hydraulic energy in place of the aforementioned electric motor, as long as the operation of the secondary actuator is independent from the operation of the kinematic drive chain. This secondary actuator would then for example be a jack, a pneumatic motor or a hydraulic motor.

Preferably, the secondary pump 113 has a piston displacement smaller than that of the main pump 103, which allows it, while meeting the lubrication needs of the compressor 35 and the upper engine part 5, to optimize the quantity of energy consumed by the lubrication system. This results in reducing the fuel consumption of the drive system 1.

Figure 2:
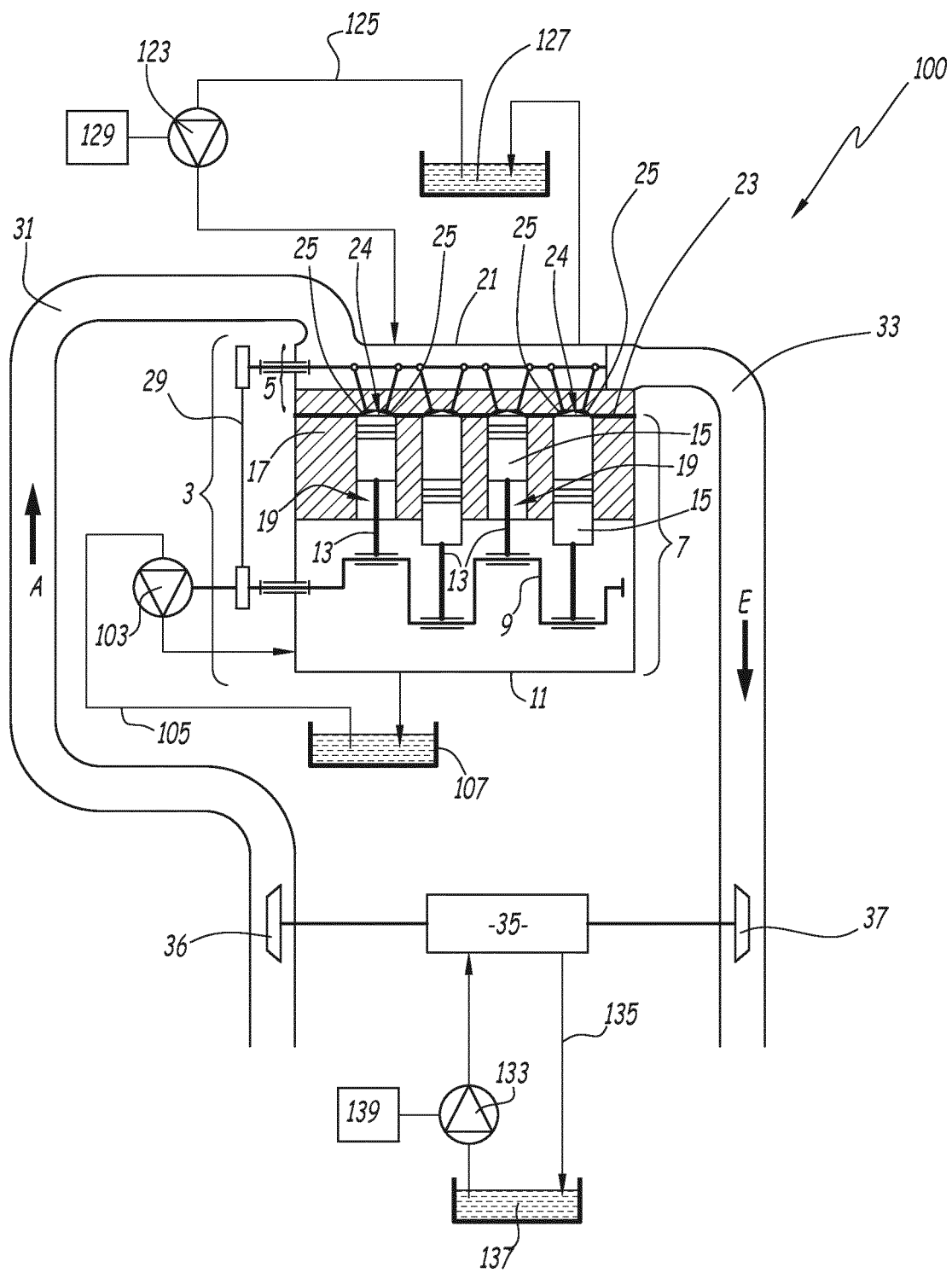
FIG. 2 is a schematic view of a drive system according to a second embodiment according to the invention.

FIG. 2 shows a second embodiment of a drive system 100 according to the invention. The similar elements between the system 1 of FIG. 1 and the system 100 of FIG. 2 have been assigned the same reference numbers.

In substance, the drive system 100 comprises an internal combustion engine 3, with an upper engine part 5 and a lower engine part 7. The lower engine part 7 includes a crankshaft 9, a case 11, connecting rods 13, pistons 15, an engine block 17 with cylinders 19 and combustion chambers 24 defined between the top of the pistons 15 and the bottom of the cylinder head 21. The upper engine part 5 is separated from the lower engine part 7 by a cylinder head gasket 23 of the engine 3, and includes a cylinder head 21, in particular with valves 25, and a control shaft 27. The engine 3 also comprises a distribution belt 29, or its alternatives defined above, and a kinematic drive chain satisfying the same definition as that of the embodiment of FIG. 1.

The system 100 comprises an intake collector 31 and an exhaust collector 33, a compressor 35 with a compression member 36 and a turbine 37.

The system 100 comprises a main lubrication system with a main circuit 105, a main pump 103 and a main lubricant reserve 107 for supplying main lubricant to the lower engine part 7 when the kinematic drive chain is in motion.

The system 100 of FIG. 2 differs from the system 1 of FIG. 1 in that it comprises two separate secondary circuits, including a first secondary circuit 125 and a second secondary circuit 135, which are separated.

The system 100 also comprises two separate secondary pumps 123 and 133, including a first secondary pump 123, which supplies the upper engine part 5 with a first secondary lubricant via the first secondary circuit 125, and a second secondary pump 133, which is separate from the first secondary pump 123 and which supplies the compressor 35 with a second secondary lubricant via the second secondary circuit 135. The first secondary lubricant and the second secondary lubricant have different compositions, i.e., different natures and different characteristics. The first secondary lubricant and the second secondary lubricant also have a different composition from that of the main lubricant.

For example, the first secondary lubricant is the Quartz Ineo MC3 5W-30 lubricant, the second secondary lubricant being the Quartz 9000 5W-40 lubricant both marketed by TOTAL SA. In general, the first secondary lubricant is chosen to be particularly suitable for the lubrication constraints of the upper engine part 7, the second secondary lubricant being chosen to be particularly suitable for the constraints for lubrication of the compressor 35.

Alternatively, among the main lubricant, the first secondary lubricant and the second secondary lubricant, two lubricants have an identical composition, the third having a different composition from the other two. Also alternatively, all three lubricants have an identical composition.

The secondary circuit 125 preferably includes a first reserve of the first secondary lubricant 127 that is separate from the main lubricant reserve 107. The secondary circuit 135 preferably includes a second reserve of the second secondary lubricant 137 that is separate from the main lubricant reserve 107 and the reserve 127.

In the example of FIG. 2, a first secondary actuator 129, mechanically independent from the kinematic drive chain, drives the first secondary pump 123 to supply the upper engine part 5 with the first secondary lubricant. A second secondary actuator 139, separate from the first secondary actuator 129, and mechanically independent from the kinematic drive chain, drives the second secondary pump 133 to supply the compressor 35 with the second secondary lubricant.

Preferably, the operation of the two secondary actuators 129 and 139 is independent from one another, such that:
 the secondary pump 123 supplies the upper engine part 5 with the first secondary lubricant during a predetermined length of time before starting the engine 3 and/or during the operation of the engine 3;
 the secondary pump 133 supplies the compressor 35 with the second secondary lubricant during the operation of the engine 3 and/or during the predetermined length of time after the engine 3 is stopped.

Alternatively, the secondary pump 133 supplies the compressor 35 with the second secondary lubricant for a predetermined length of time before the engine 3 is started, in order to facilitate the starting of the compressor 35 and therefore to limit its wear.

The first secondary circuit 125 extends partially within the upper engine part 5 in particular to lubricate the rotating connections between the control shaft 27 and the cylinder head 23 and the valves 25. The second secondary circuit 135 extends partially within the compressor 35 in particular to lubricate the rotating connections of the member 36 and, if applicable, the turbine 37.

The lubrication, as well as the composition of the lubricant, of the lower engine part 5 and the compressor 35 can thus be optimized based on the lubrication needs specific to each of these two members of the drive system 100.

The secondary actuators 129 and 139 operate either using the same energy, for example electric, or using two different energies, for example one being powered by electrical energy and the other by pneumatic energy.

Preferably, the first secondary pump 123 has a piston displacement lower than that of the second secondary pump 133, such that the secondary pumps 123 and 133 supply a quantity of lubricants adapted on the one hand to the upper engine part 5 and on the other hand to the compressor 35. The energy necessary to actuate the secondary pumps 123 and 133 is thus optimized.

Preferably, the first secondary pump 123 has a piston displacement comprised between 3 and 15 cc/revolution and the second secondary pump 133 has a piston displacement comprised between 1 and 10 cc/revolution.

Alternatively, the invention also applies to engines whose spatial configuration is different from that of the examples of drive systems described above, in particular so-called "flat" engines. It is understood that in the case of these particular engines, the upper engine part is not necessarily placed above the lower engine part. Thus, in the case of these particular engines, the term "upper engine part" defined above refers to the cylinder head in particular equipped with control shaft(s) and the distribution system, the term "lower engine part" referring to the case and the engine block, in particular equipped with pistons, connecting rods, the crankshaft, cylinders and combustion chambers.

The invention was tested on a diesel engine with a 2 L piston displacement, namely the DW10 engine by the company PSA Peugeot Citroen. It made it possible to obtain a fuel consumption gain of about 3% on charging rate stabilized operating points, representing the NEDC (New European Driving Cycle) normalized cycle.

The embodiments and alternatives described above may be combined to form new embodiments.

The invention claimed is:

1. A drive system for a motor vehicle, the system comprising:
 an internal combustion engine, which comprises an upper engine part and a lower engine part that are coupled, and also comprise a kinematic drive chain including at least one piston and a crankshaft;
 a compressor, which equips the internal combustion engine, and which is configured to compress, at least in part, an intake fluid intended to fill cylinders of the lower engine part;
 a main lubrication system, which comprises:
  a main circuit, including a main lubricant reserve,
  a main pump, and
  a main lubricant, the main pump supplying at least the lower engine part with the main lubricant via the main circuit, and
 a secondary lubrication system, which comprises:
  at least one secondary circuit, separated from the main circuit and comprising a secondary lubricant reserve separate from the main lubricant reserve,
  at least one secondary pump, separate from the main pump, and
  at least one secondary lubricant, the secondary pump supplying the upper engine part and/or the compressor with the secondary lubricant via the secondary circuit,
 wherein the main lubricant and the secondary lubricant do not come into contact with each other,
 wherein the main lubricant has a composition different from the composition of the secondary lubricant,
 wherein the composition of the main lubricant is adapted to a lubrication material constraint of the lower engine part,
 wherein the composition of the secondary lubricant is adapted to a lubrication material constraint of the upper engine part and/or the compressor for which the secondary lubricant is supplied via the secondary circuit,
 wherein the secondary lubrication system comprises at least one secondary actuator that is mechanically independent from the kinematic drive chain and that drives the secondary pump to supply the upper engine part and/or the compressor with the secondary lubricant,
 and wherein the main pump has a piston displacement greater than the piston displacement of each secondary pump.

2. The drive system according to claim 1, wherein the secondary actuator operates with electrical energy.

3. The drive system according to claim 2, wherein the at least one secondary circuit comprises two separate secondary circuits, including a first secondary circuit, comprising a first secondary lubricant reserve that is separate from the main lubricant reserve, and a second secondary circuit, comprising a second secondary lubricant reserve separate from the first secondary lubricant reserve and from the main lubricant reserve,
 the main circuit, the first secondary circuit, and the second secondary circuit being separated, wherein the at least one secondary pump comprises two secondary pumps, including:
a first secondary pump, which supplies the upper engine part with a first secondary lubricant via the first secondary circuit, and
a second secondary pump, which is separate from the first secondary pump and which supplies the compressor with a second secondary lubricant via the second secondary circuit,
and wherein the main lubricant, the first secondary lubricant, and the second secondary lubricant do not come into contact with each other.

4. The drive system according to claim 2, wherein the main pump has a piston displacement between 5 cc/revolution and 20 cc/revolution.

5. The drive system according to claim 1,
wherein the at least one secondary circuit comprises two separate secondary circuits, including a first secondary circuit, comprising a first secondary lubricant reserve that is separate from the main lubricant reserve, and a second secondary circuit, comprising a second secondary lubricant reserve separate from the first secondary lubricant reserve and from the main lubricant reserve, the main circuit, the first secondary circuit, and the second secondary circuit being separate from one another,
wherein the at least one secondary pump comprises two secondary pumps, including:
a first secondary pump, which supplies the upper engine part with a first secondary lubricant via the first secondary circuit, and
a second secondary pump, which is separate from the first secondary pump and which supplies the compressor with a second secondary lubricant via the second secondary circuit,
and wherein the main lubricant, the first secondary lubricant, and the second secondary lubricant do not come into contact with each other.

6. The drive system according to claim 5, wherein the first secondary pump has a piston displacement lower than that of the second secondary pump.

7. The drive system according to claim 6,
wherein the composition of the first secondary lubricant is different from that of the second secondary lubricant,
wherein the composition of the first secondary lubricant is adapted to the lubrication material constraint of the upper engine, and
wherein the composition of the second secondary lubricant is adapted to a lubrication material constraint of compressor.

8. The drive system according to claim 6, wherein the main pump has a piston displacement between 5 cc/revolution and 20 cc/revolution.

9. The drive system according to claim 5,
wherein the composition of the first secondary lubricant is different from that of the second secondary lubricant,
wherein the composition of the first secondary lubricant is adapted to the lubrication material constraint of the upper engine, and
wherein the composition of the second secondary lubricant is adapted to a lubrication material constraint of the compressor.

10. The drive system according to claim 9, wherein the main pump has a piston displacement between 5 cc/revolution and 20 cc/revolution.

11. The drive system according to claim 5, wherein the main pump has a piston displacement between 5 cc/revolution and 20 cc/revolution.

12. The drive system according to claim 1, wherein the main pump has a piston displacement between 5 cc/revolution and 20 cc/revolution.

13. The drive system of claim 12, wherein the main pump has a piston displacement between 7 cc/revolution and 12 cc/revolution.

14. The drive system of claim 12, wherein the main pump has a piston displacement of 10.7 cc/revolution.

15. The drive system according to claim 1, wherein the main pump is actuated by the kinematic drive chain.

16. The drive system according to claim 1, wherein the secondary pump is a variable flow rate pump.

17. The drive system according to claim 1, wherein the main lubricant is a lubricant composition having a grade, according to the SAEJ300 classification, defined by the formula (X)W-Y, in which X represents 0 or 5 and Y represents 4, 8, 12, 16 or 20, etc.

18. The drive system according to claim 1, wherein the compressor is a turbocompressor.

19. A motor vehicle comprising a drive system according to claim 1.

* * * * *